United States Patent
Nagae

(10) Patent No.: US 9,314,881 B2
(45) Date of Patent: Apr. 19, 2016

(54) FLUX FOR BRAZING ALUMINUM MATERIALS

(75) Inventor: Takahiro Nagae, Osaka (JP)

(73) Assignee: DAIICHI KIGENSO KAGAKU KOGYO CO., LTD., Osaka-shi (JP)

( * ) Notice: Subject to any disclaimer, the term of this patent is extended or adjusted under 35 U.S.C. 154(b) by 145 days.

(21) Appl. No.: 14/130,725

(22) PCT Filed: Jul. 6, 2012

(86) PCT No.: PCT/JP2012/067282
§ 371 (c)(1),
(2), (4) Date: Jan. 3, 2014

(87) PCT Pub. No.: WO2013/008731
PCT Pub. Date: Jan. 17, 2013

(65) Prior Publication Data
US 2014/0174606 A1 Jun. 26, 2014

(30) Foreign Application Priority Data
Jul. 11, 2011 (JP) .................................. 2011-166003

(51) Int. Cl.
*B23K 35/36* (2006.01)
*B23K 35/28* (2006.01)
*B23K 35/362* (2006.01)

(52) U.S. Cl.
CPC ........... *B23K 35/3605* (2013.01); *B23K 35/286* (2013.01); *B23K 35/362* (2013.01); *B23K 2203/10* (2013.01)

(58) Field of Classification Search
CPC ..................... B23K 35/3605; B23K 35/286
USPC ....................................................... 228/223
See application file for complete search history.

(56) References Cited

U.S. PATENT DOCUMENTS

| 4,670,067 A | 6/1987 | Suzuki et al. |
| 4,689,092 A | 8/1987 | Suzuki et al. |

FOREIGN PATENT DOCUMENTS

| CN | 101407003 A | 4/2009 |
| CN | 101439449 A | 5/2009 |

(Continued)

OTHER PUBLICATIONS

Office Action dated Jun. 2, 2015, issued in counterpart Chinese application No. 201280033273.5, w/English Translation. (8 pages).

(Continued)

*Primary Examiner* — Weiping Zhu
(74) *Attorney, Agent, or Firm* — Westerman, Hattori, Daniels & Adrian, LLP

(57) ABSTRACT

The present invention provides a flux for brazing aluminum-based materials, the flux being capable of brazing an A5052 alloy or the like containing 1.5 wt % or more of magnesium even when an Al—Si eutectic alloy (Si content: 7 to 12 wt %; A4343 alloy, A4047 alloy; melt starting temperature: about 577 to 615° C.) is used as a brazing material. Specifically, the present invention provides a flux for brazing aluminum-based materials, the flux comprising LiF, $AlF_3$, and CsF, and the composition ratio of the three components being adjusted to within the range enclosed by four lines: line C connecting (30, 0, 70) and (30, 70, 0), line (1) connecting (31, 33.5, 35.5) and (51.5, 22.5, 26), line (2) connecting (32.5, 28.5, 39) and (49, 21.5, 29.5), and line (3) connecting (57.5, 42.5, 0) and (57.5, 0, 42.5), excluding the points on line C, in the triangular coordinates indicating LiF mol %, $AlF_3$ mol %, and CsF mol %.

1 Claim, 1 Drawing Sheet

(56) References Cited

FOREIGN PATENT DOCUMENTS

| | | | |
|---|---|---|---|
| JP | 61-162295 | A | 7/1986 |
| JP | 61-249700 | A | 11/1986 |
| JP | 3-264191 | A | 11/1991 |
| JP | 03-264192 | A | 11/1991 |
| JP | 03264192 | A * | 11/1991 |
| JP | 4-84691 | A | 3/1992 |
| JP | 05-005600 | B2 | 1/1993 |
| JP | 05-051398 | B2 | 8/1993 |
| JP | 6-344179 | A | 12/1994 |
| JP | 07-001177 | A | 1/1995 |
| JP | 2005-040839 | A | 2/2005 |
| JP | 2008-500182 | A | 1/2008 |
| WO | 2005/123309 | A1 | 12/2005 |

OTHER PUBLICATIONS

International Search Report of PCT/JP2012/067282, mailing date of Aug. 21, 2012.

* cited by examiner

FLUX FOR BRAZING ALUMINUM MATERIALS

TECHNICAL FIELD

The present invention relates to a flux for brazing aluminum-based materials, especially to a flux for brazing an aluminum-based material containing 1.5 wt % or more of magnesium.

BACKGROUND ART

Aluminum silicon (Al—Si) eutectic alloys, which have a slightly lower melting point than aluminum-based materials, have been mainly used as materials for brazing aluminum materials or aluminum alloy materials (hereinafter simply referred to as aluminum-based materials).

For good adhesion between a brazing material and an aluminum-based material, removal of oxide film, etc., present on the surface of the aluminum-based material is required. To remove such an oxide film, etc., it is necessary to supply a flux together with a brazing material to the portion to be brazed.

In recent years, non-corrosive or water-insoluble fluoride-based fluxes are mainly used in place of conventional chlorine-based fluxes.

Such fluoride-based fluxes have excellent features, such as almost no corrosivity, water solubility, or moisture absorbency compared to conventional chlorine-based fluxes.

Since containing magnesium increases the strength of aluminum alloys, it is generally known that aluminum alloy products such as heat exchangers, automobile parts, bicycle parts, and pipes are preferably produced by brazing aluminum alloy materials containing 1.5 wt % or more of magnesium that has high strength and excellent corrosion resistance. As a result, the thickness of the product is reduced, thus reducing the weight.

However, in brazing using a fluoride-based flux, when the magnesium content in an aluminum alloy is 1.5 wt % or more, magnesium is reacted with the fluoride-based flux to produce a high-melting-point compound on the aluminum alloy surface, which reduces the effect of the flux and inhibits wetting and permeation of a brazing material. Thus, the brazing properties are remarkably decreased, making it impossible to perform brazing sometimes.

Patent Literature 1 discloses "a flux composition for brazing Al materials, the composition mainly comprising a molten and coagulated product of a powdery mixture of LiF, $AlF_3$, and CsF, wherein the composition ratio of the three components is adjusted to within the range enclosed by four lines, i.e., line A connecting (2, 0, 98) and (2, 98, 0), line B connecting (0, 22, 78) and (78, 22, 0), line C connecting (30, 0, 70) and (30, 70, 0), and line D connecting (60, 40, 0) and (0, 70, 30) in the triangular coordinates indicating LiF mol %, $AlF_3$ mol %, and CsF mol %. Patent Literature 1 uses a Zn—Al solder (melt starting temperature: about 380° C. or more) as a brazing material and has a problem of pitting corrosion due to the difference in corrosion potential.

Patent Literature 2 discloses a flux-containing Al alloy brazing material comprising a flux component, and Al, Si, and Cu as a brazing material component, wherein the Si content and the Cu content in the brazing material component are respectively 0.05 to 20 wt % and 5 to 10 wt %; the flux component contains KF, LiF, and CsF, and is a fluoride-based flux in which KF, LiF, and CsF are mixed in the range enclosed by a liquidus line at 550° C. in the ternary phase diagram of KF—LiF—CsF; the brazing material component and the flux component are added in a weight ratio of 99.9:0.1 to 70:30; and the flux-containing Al alloy brazing material has a density of 90% or more of the theoretical value. Patent Literature 2 discloses that an Al—Si—Cu alloy (melt starting temperature: about 524° C. or more) used as a brazing material can braze an A5052 alloy containing 2.2 to 2.8 wt % of magnesium; however, an Al—Si eutectic alloy (Si content: 7 to 12 wt %, A4343 alloy and A4047 alloy, melt starting temperature: about 577 to 615° C.) used as a brazing material cannot braze the A5052 alloy.

Patent Literature 3 discloses a flux for brazing an aluminum-based material, comprising, expressed in mol %, potassium fluoride in an amount exceeding 0 mol % to less than 42 mol %, cesium fluoride in an amount of 2 mol % to less than 74 mol %, and aluminum fluoride in an amount of 26 to 67 mol %, or potassium fluoride in an amount of 42 to 54 mol %, cesium fluoride in an amount exceeding 20 to 32 mol %, and aluminum fluoride in an amount of 26 mol % to less than 38 mol %, with potassium and cesium present as fluoroaluminate, and free cesium fluoride and potassium fluoride not included. In Patent Literature 3, when an Al—Si eutectic alloy (Si content: 7 to 12 wt %, A4343 alloy, A4047 alloy, melt starting temperature: about 577 to about 615° C.) is used as a brazing material, the limitation of the magnesium content is 1 wt % (A6061 alloy), and an A5052 alloy containing 2.2 to 2.8 wt % of magnesium cannot be brazed.

CITATION LIST

Patent Literature

PTL 1: JP5-005600B
PTL 2: JP7-001177A
PTL 3: JP5-051398B

SUMMARY OF INVENTION

Technical Problem

The present invention was accomplished in light of the above problems. An object of the present invention is to provide a flux for brazing aluminum-based materials, the flux being capable of brazing an A5052 alloy or the like containing 1.5 wt % or more of magnesium even when an Al—Si eutectic alloy (Si content: 7 to 12 wt %; A4343 alloy, A4047 alloy; melt starting temperature: about 577 to 615° C.) is used as a brazing material.

Solution to Problem

The present inventors conducted extensive research to attain the above object. As a result, they found that, in the specific composition range of a ternary flux comprising LiF, $AlF_3$, and CsF, it is possible to obtain the flux for brazing an aluminum-based material, which is capable of brazing A5052 alloy or the like containing 1.5 wt % or more of magnesium even when an Al—Si eutectic alloy is used as a brazing material.

Based on this finding, the present invention provides (1) a flux for brazing aluminum-based materials, the flux comprising LiF, $AlF_3$, and CsF, and the three components having a composition ratio adjusted to within the range enclosed by four lines: line C connecting (30, 0, 70) and (30, 70, 0), line (1) connecting (31, 33.5, 35.5) and (51.5, 22.5, 26), line (2) connecting (32.5, 28.5, 39) and (49, 21.5, 29.5), and line (3) connecting (57.5, 42.5, 0) and (57.5, 0, 42.5), excluding the points on line C, in the triangular coordinates indicating LiF mol %, AlF$_3$ mol %, and CsF mol %.

Advantageous Effects of Invention

The flux for brazing aluminum-based materials of the present invention can braze an A5052 alloy or the like containing 1.5 wt % or more of magnesium even when an Al—Si eutectic alloy is used as a brazing material; thus, the present invention can be preferably used in this field.

The flux for brazing aluminum-based materials of the present invention can be used without any problems for brazing an aluminum-based material containing less than 1.5 wt % of magnesium or an aluminum-based material containing no magnesium.

DESCRIPTION OF EMBODIMENTS

The flux for brazing aluminum-based materials of the present invention is explained in detail below.

Figure 1:
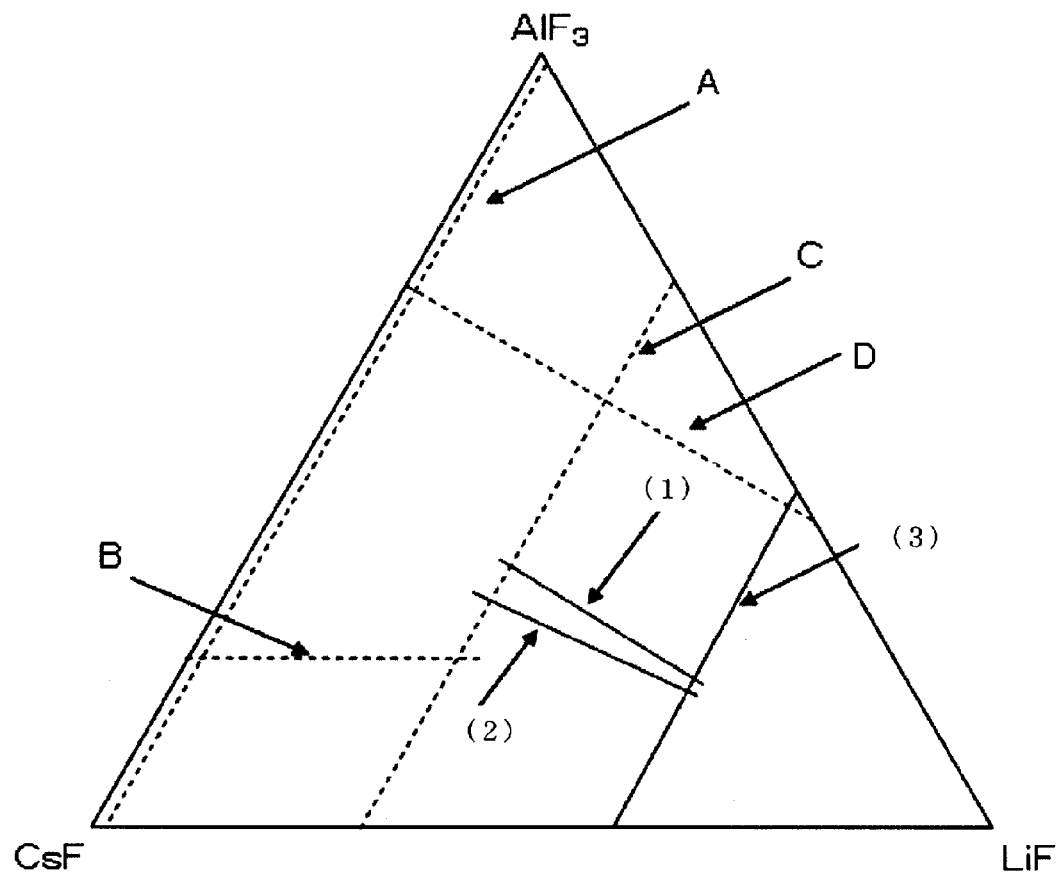
FIG. 1 shows the triangular coordinates indicating the composition ratio range of the flux of the present invention.

The present invention is a flux for brazing aluminum-based materials, the flux comprising LiF, AlF$_3$, and CsF, wherein the composition ratio of the three components is adjusted to within the range enclosed by four lines: line C connecting (30, 0, 70) and (30, 70, 0), line (1) connecting (31, 33.5, 35.5) and (51.5, 22.5, 26), line (2) connecting (32.5, 28.5, 39) and (49, 21.5, 29.5), and line (3) connecting (57.5, 42.5, 0) and (57.5, 0, 42.5), excluding the points on line C, in the triangular coordinates indicating LiF mol %, AlF$_3$ mol %, and CsF mol % (see FIG. 1).

Preferably, in the triangular coordinates indicating LiF Mol %, AlF$_3$ mol %, and CsF mol %, the composition ratio of the three components is within the range enclosed by four lines: line C connecting (30, 0, 70) and (30, 70, 0), line (4) connecting (56, 20, 24) and (37.5, 30, 32.5), line (5) connecting (37.5, 30, 32.5) and (31, 33, 36), and line (6) connecting (56, 20, 24) and (31, 30, 39), excluding the points on line C (not shown).

In FIG. 1, the range enclosed by four lines, i.e., line A, line B, line C, and line D, corresponds to the flux composition for brazing Al materials of Patent Literature 1.

When the proportion of LiF, AlF$_3$, and CsF composing the flux is outside the above range, the melting temperature is increased. Further, due to the reaction of magnesium in the aluminum alloy, the brazing properties are not fully exhibited, which makes it impossible to sufficiently attain the object of the present invention.

As a brazing material, it is preferable to use a versatile Al—Si eutectic alloy (Si content: 7 to 12 wt %; A4343 alloy, A4047 alloy; melt starting temperature: about 577 to 615° C.); however, other brazing materials can be also used. Zinc, copper, and other components can be added to adjust the flow starting temperature, solidus temperature, and liquidus temperature.

The aluminum-based material to which the flux of the present invention can be applied may be a material containing no magnesium; however, the flux can be preferably used for an A5052 alloy or the like containing 1.5 wt % or more of magnesium.

Although the upper limit of the magnesium content in the aluminum alloy is not particularly limited, it is about 5 wt % considering the content of magnesium in the magnesium-containing aluminum alloy according to JIS (magnesium content in A5082 alloy: 4 to 5 wt %, magnesium content in A5182 alloy: 4 to 5 wt %, and magnesium content in A5086 alloy: 3.5 to 4.5 wt %).

A brazed article to which the present invention is applied can have any structure as long as the brazing of aluminum alloy material described below can be performed.

(1) As is a fin material or connector material of a heat exchanger, a bare material of a magnesium-containing aluminum alloy is brazed using a brazing material in the form of brazing sheet or a preplaced brazing material, or brazed using a brazing material in the form of brazing sheet in which magnesium is added to a core material.

(2) Face-fed brazing is performed on a pipe or block of magnesium-containing aluminum alloy, or brazing is performed using a cored wire in which a flux is coated with a brazing material.

The present invention can also be described as follows.

(i) A flux for brazing aluminum-based materials,
the flux being used when an Al—Si eutectic alloy is used as a brazing material,
the flux comprising LiF, AlF$_3$, and CsF, and
the three components having a composition ratio adjusted to within the range enclosed by four lines: line C connecting (30, 0, 70) and (30, 70, 0), line (1) connecting (31, 33.5, 35.5) and (51.5, 22.5, 26), line (2) connecting (32.5, 28.5, 39) and (49, 21.5, 29.5), and line (3) connecting (57.5, 42.5, 0) and (57.5, 0, 42.5), excluding the points on line C, in the triangular coordinates indicating LiF mol %, AlF$_3$ mol %, and CsF mol %.

(ii) Use of a flux for brazing aluminum-based materials,
the flux being used when an Al—Si eutectic alloy is used as a brazing material,
the flux comprising LiF, AlF$_3$, and CsF, and
the three components having a composition ratio adjusted to within the range enclosed by four lines: line C connecting (30, 0, 70) and (30, 70, 0), line (1) connecting (31, 33.5, 35.5) and (51.5, 22.5, 26), line (2) connecting (32.5, 28.5, 39) and (49, 21.5, 29.5), and line (3) connecting (57.5, 42.5, 0) and (57.5, 0, 42.5), excluding the points on line C in the triangular coordinates indicating LiF mol %, AlF$_3$ mol %, and CsF mol %.

(iii) A method for using a flux for brazing aluminum-based materials when an Al—Si eutectic alloy is used as a brazing material,
the flux comprising LiF, AlF$_3$, and CsF, and
the three components having a composition ratio adjusted to within the range enclosed by four lines: line C connecting (30, 0, 70) and (30, 70, 0), line (1) connecting (31, 33.5, 35.5) and (51.5, 22.5, 26), line (2) connecting (32.5, 28.5, 39) and (49, 21.5, 29.5), and line (3) connecting (57.5, 42.5, 0) and (57.5, 0, 42.5), excluding the points on line C, in the triangular coordinates indicating LiF mol %, AlF$_3$ mol %, and CsF mol %.

EXAMPLE

The Example of the present invention is detailed below.

Example 1

First, flux powders having the composition shown in Table 1 were prepared. Subsequently, aluminum-based A5052 alloy plates were prepared (width: 50 mm, length: 50 mm, thickness: 1 mm; magnesium content: 2.2 to 2.8 wt %).

Figure 2:
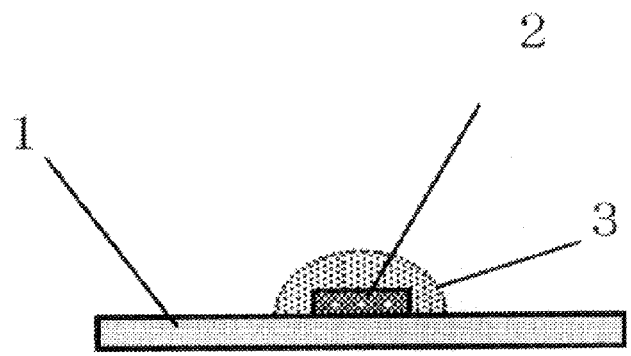
FIG. 2 shows the method for evaluating the wetting and spread of the brazing material used in Example 1 of the present invention.

As shown in FIG. 2, brazing material (2) (130 mg) formed of A4047 alloy and flux (3) (60 to 130 mg) were applied to the surface of A5052 alloy plate (1), and heated from the bottom over a gas burner to evaluate the wetting and spread of the brazing material. Table 1 shows the results.

TABLE 1

| Performance number | Composition of flux (mol %) | | | Brazing properties on A5052 (see note) |
|---|---|---|---|---|
| | CsF | LiF | $AlF_3$ | |
| 1 | 36.0 | 31.0 | 33.0 | ○ |
| 2 | 27.0 | 50.0 | 23.0 | ○ |
| 3 | 39.0 | 31.0 | 30.0 | ○ |
| 4 | 24.0 | 56.0 | 20.0 | ○ |
| 5 | 37.0 | 33.0 | 30.0 | ○ |
| 6 | 32.5 | 37.5 | 30.0 | ○ |
| 7 | 35.0 | 31.0 | 34.0 | X |
| 8 | 25.0 | 53.0 | 22.0 | X |
| 9 | 39.0 | 34.0 | 27.0 | X |
| 10 | 32.0 | 48.0 | 20.0 | X |
| 11 | 23.0 | 59.0 | 18.0 | X |

Note:
Evaluation of wetting of brazing material
○: Sufficient wetting and spread of brazing material.
X: Almost no wetting or spread of brazing material.

Table 1 confirmed good wetting and spread of brazing material when the composition ratio of the three components was within the range enclosed by four lines: line C connecting (30, 0, 70) and (30, 70, 0), line (1) connecting (31, 33.5, 35.5) and (51.5, 22.5, 26), line (2) connecting (32.5, 28.5, 39) and (49, 21.5, 29.5), and line (3) connecting (57.5, 42.5, 0) and (57.5, 0, 42.5), excluding the points on line C, in the triangular coordinates indicating LiF mol %, $AlF_3$ mol %, and CsF mol %

EXPLANATION OF NUMERALS

1: A5052 alloy plate
2: Brazing material
3: Flux

The invention claimed is:
1. A flux for brazing aluminum-based materials, comprising:
   LiF,
   $AlF_3$, and
   CsF, and
   the three components having a composition ratio adjusted to within a range enclosed by four lines: line C connecting (30, 0, 70) and (30, 70, 0), line (1) connecting (31, 33.5, 35.5) and (51.5, 22.5, 26), line (2) connecting (32.5, 28.5, 39) and (49, 21.5, 29.5), and line (3) connecting (57.5, 42.5, 0) and (57.5, 0, 42.5), excluding points on line C, in a triangular coordinates indicating LiF mol %, $AlF_3$ mol %, and CsF mol %.

* * * * *